(12) United States Patent
Klemm et al.

(10) Patent No.: US 8,951,156 B2
(45) Date of Patent: Feb. 10, 2015

(54) TRANSFER CASE WITH PLANETARY GEAR RANGE SHIFTING

(75) Inventors: Laura Klemm, Shelby Township, MI (US); Richard Gady, Rochester Hills, MI (US); Matthew Starna, New Baltimore, MI (US); Aleksey Khoryshev, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 297 days.

(21) Appl. No.: 13/179,797

(22) Filed: Jul. 11, 2011

(65) Prior Publication Data

US 2013/0017919 A1    Jan. 17, 2013

(51) Int. Cl.
| | | |
|---|---|---|
| F16H 3/44 | (2006.01) | |
| F16H 3/54 | (2006.01) | |
| F16H 48/30 | (2012.01) | |
| B60K 17/346 | (2006.01) | |
| F16H 63/30 | (2006.01) | |

(52) U.S. Cl.
CPC ........ B60K 17/3462 (2013.01); F16H 63/3023 (2013.01); B60K 17/3467 (2013.01); *F16H 2063/303* (2013.01)
USPC .......................................... 475/138; 475/298

(58) Field of Classification Search
USPC .................. 475/296, 269, 298, 138
See application file for complete search history.

(56) References Cited

U.S. PATENT DOCUMENTS

| | | | | |
|---|---|---|---|---|
| 1,997,057 | A * | 4/1935 | Hamilton, Jr. ................. | 475/124 |
| 2,480,801 | A * | 8/1949 | Wilson et al. ................. | 477/105 |
| 4,462,271 | A * | 7/1984 | Stieg ................................ | 475/86 |
| 4,549,449 | A * | 10/1985 | Miller et al. .................. | 475/138 |
| 4,611,506 | A * | 9/1986 | Groothius ..................... | 475/138 |
| 4,648,492 | A | 3/1987 | Moore | |
| 5,046,998 | A * | 9/1991 | Frost ............................. | 475/221 |
| 5,226,860 | A | 7/1993 | Baxter, Jr. et al. | |
| 5,231,895 | A | 8/1993 | Stine | |
| 5,499,951 | A * | 3/1996 | Showalter ..................... | 475/204 |
| 8,123,645 | B2 * | 2/2012 | Schimke ....................... | 475/200 |
| 2005/0215376 | A1 | 9/2005 | Williiams et al. | |
| 2009/0247346 | A1* | 10/2009 | Hvolka et al. ................. | 475/155 |
| 2010/0248884 | A1* | 9/2010 | Tremblay ..................... | 475/138 |

FOREIGN PATENT DOCUMENTS

DE          3612869 A1    12/1986

* cited by examiner

*Primary Examiner* — Gene Crawford
*Assistant Examiner* — Ryan Dodd
(74) *Attorney, Agent, or Firm* — Brooks Kushman P.C.

(57) ABSTRACT

A transfer case having a planetary gear set, a clutch collar, and an actuator. The actuator is configured to actuate the clutch collar between a low speed range position in which the clutch collar engages a planet gear carrier of the planetary gear set, and a high speed range position in which the clutch collar engages a sun gear of the planetary gear set.

20 Claims, 3 Drawing Sheets

US 8,951,156 B2

TRANSFER CASE WITH PLANETARY GEAR RANGE SHIFTING

TECHNICAL FIELD

The present application relates to a transfer case that may be provided with a vehicle.

BACKGROUND

A torque transfer case is disclosed in U.S. Pat. No. 5,226,860.

SUMMARY

In at least one embodiment a transfer case is provided. The transfer case may include a planetary gear set, an input shaft, a clutch collar, and an actuator. The planetary gear set may have a sun gear, a plurality of planet gears, a ring gear, and a planet gear carrier. The input shaft may be disposed proximate the planetary gear set. The clutch collar may be moveably disposed on the input shaft and may selectively couple the planetary gear set to the input shaft. The actuator may be configured to actuate the clutch collar between a low speed range position and a high speed range position. The clutch collar engages the planet gear carrier and is disengaged from the sun gear in the low speed range position. The clutch collar engages the sun gear and is disengaged from the planet gear carrier in the high speed range position.

In at least one embodiment a transfer case is provided. The transfer case may include an input shaft, a clutch collar, and a planetary gear set. The clutch collar may be moveably disposed on the input shaft. The clutch collar may have a face gear provided on an end surface and a spline provided along a circumference. The planetary gear set may have a sun gear that is operatively coupled to a planet gear carrier via a plurality of planet gears. The sun gear may have a face gear. The planet gear carrier may have a spline. The face gear on the clutch collar engages the face gear on the sun gear when the clutch collar is in a high speed range position. The spline on the clutch collar engages the spline on the planet gear carrier when the clutch collar is in a low speed range position.

In at least one embodiment, a transfer case for a vehicle is provided. The transfer case may include an input shaft, a clutch collar, an actuator, and a shift fork. The clutch collar may be disposed on the input shaft and may be configured to move between a first position in which a first gear ratio is engaged and a second position in which a second gear ratio is engaged. The actuator may include a first piston, a second piston, and an actuator shaft. The first piston may be disposed in a first cavity that has a first port. The second piston may be disposed in a second cavity that has second and third ports. The actuator shaft may be configured to engage the first and second pistons. The shift fork may couple the actuator shaft and the clutch collar. Pressurized fluid may be provided to the first cavity via the first port to actuate the clutch collar to the first position. Pressurized fluid may be provided to the second cavity via the second and third ports to actuate the clutch collar to the second position.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
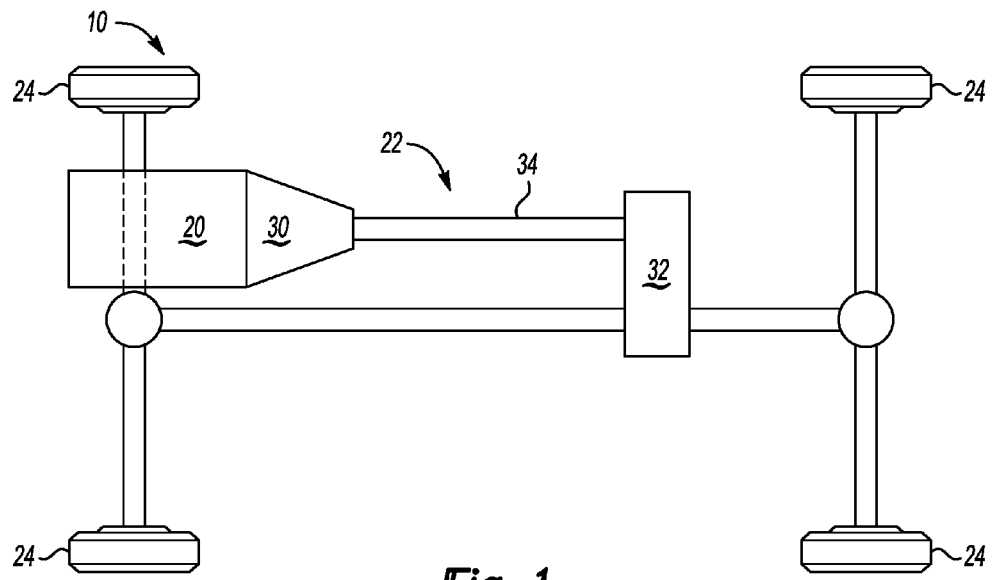
FIG. 1 is a schematic of an exemplary vehicle having a transfer case.

Referring to FIG. 1, an exemplary vehicle 10 is shown. The vehicle 10 may be a motor vehicle, such as a truck, bus, or automobile. The vehicle 10 may include one or more power sources 20 and a drivetrain 22.

The power source 20 may provide power that may be used to rotate one or more traction wheels 24. In FIG. 1, a single power source 20 is shown that may be configured as an internal combustion engine that may be adapted to combust any suitable type of fuel, such as gasoline, diesel fuel, or hydrogen. Alternatively, multiple power sources could be provided, such as may be employed with a hybrid vehicle. In such an embodiment, a power source could be an electric power source, such as a battery, capacitor, or fuel cell, or a non-electric power source, such as a hydraulic power source.

The drivetrain 22 may be driven or powered by one or more power sources 20 to provide torque to one or more traction wheels 24. The drivetrain 22 may include a transmission 30 and a transfer case 32. The power source 20 may be coupled to the input of the transmission 30. An output of the transmission 30, such as an output shaft 34, may be coupled to an input of the transfer case 32. One or more outputs of the transfer case 32 may be coupled to one or more sets of vehicle traction wheels 24.

Figure 2:
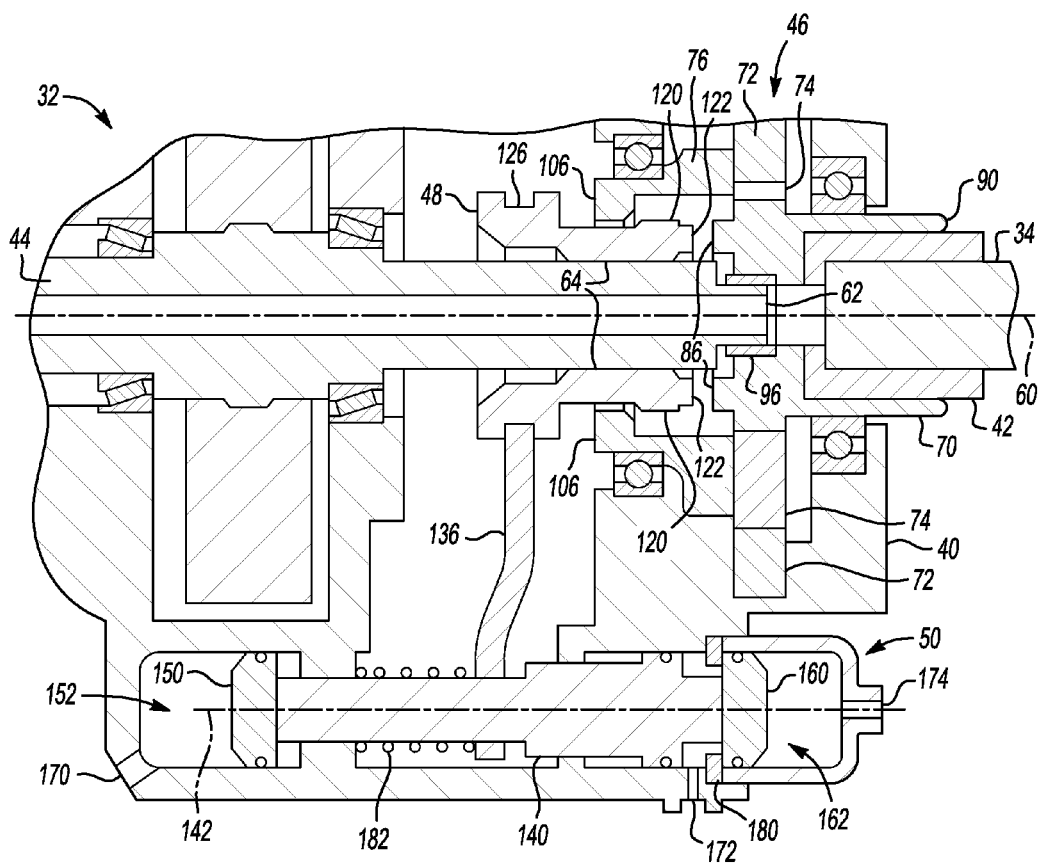
FIG. 2 is a fragmentary section view of a portion of the transfer case illustrating a neutral position.

Referring to FIG. 2, a portion of the transfer case 32 is shown in more detail. The transfer case 32 may include a housing 40, an adapter 42, an input shaft 44, a planetary gear set 46, a clutch collar 48, and an actuator 50.

The housing 40 may be provided to receive various components of the transfer case 32. In addition, the housing 40 may facilitate mounting of the transfer case 32 to the vehicle 10.

The adapter 42 may facilitate coupling of the transmission 30 to the transfer case 32. For example, the adapter 42 may include a center bore that may receive the output shaft 34 that extends from the transmission 30. The center bore and the output shaft 34 may be provided with mating splines that may help align and secure the output shaft 34 to the adapter 42. The adapter 42 may also include a spline disposed on an exterior surface or outside diameter.

The input shaft 44 may be rotatably disposed in the housing 30. The input shaft 44 may extend along an axis of rotation 60 and may have an end 62 and a spline 64. The end 62 may be disposed proximate but may not be fixedly coupled to the planetary gear set 46. The spline 64 may be disposed along a portion of the exterior surface or outside diameter of the input shaft 44 near the end 62. The teeth of the spline 64 may extend generally parallel to the axis of rotation 60 to facilitate sliding movement of the clutch collar 48 along the input shaft 44 as will be described in more detail below.

The planetary gear set 46 may be disposed in the housing 40 and may be configured to provide a desired gear reduction ratio. The planetary gear set 46 may include a sun gear 70, a ring gear 72, a plurality of planet gears 74, and a planet gear carrier 76.

Figure 5:
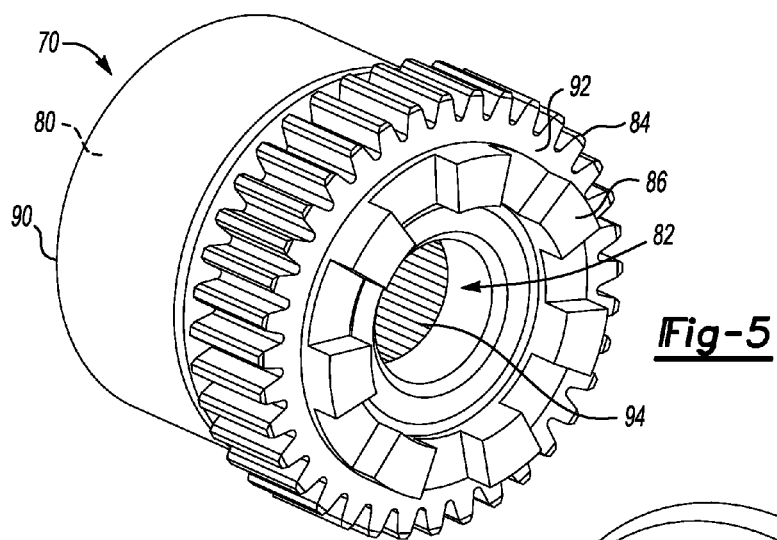
FIG. 5 is a perspective view of an exemplary sun gear.

Referring to FIGS. 2 and 5, an exemplary sun gear 70 is shown. The sun gear 70 may be configured to rotate about the axis of rotation 60 and may include a cavity 80, a hole 82, a first gear portion 84, and a second gear portion 86.

The cavity 80 may be configured to receive the adapter 42. In at least one embodiment, the cavity 80 may extend partially through the sun gear 70 from a first end 90 toward a second end 92 that may be disposed opposite the first end 90. A spline 94 may be provided on an interior surface or inside diameter of the sun gear 70 that at least partially defines the cavity 80. The teeth of the spline 94 may extend generally parallel to the axis of rotation 60 and may engage and mate with a similarly configured spline disposed on the exterior surface of the adapter 42 to fixedly position the adapter 42 in the cavity 80.

The hole 82 may have a smaller diameter than the cavity 80 and may extend from the cavity 80 to the second end 92. The hole 82 may receive a bearing 96 that may receive and support the end 62 of the input shaft 44 and permit the input shaft 44 to rotate independently or at a different rotational velocity than the sun gear 70.

The first gear portion 84 may be disposed on an exterior surface or outside diameter of the sun gear 70 near the second end 92. The first gear portion 84 may include a set of teeth that are configured to engage the planet gears 74.

The second gear portion 86 or face gear may be provided on the second end 92 of the sun gear 70. The second gear portion 86 may include a set of teeth that may be arranged around the axis of rotation 60. In at least one embodiment, the teeth may be disposed at a common radial distance from the axis of rotation 60 and substantially equidistantly spaced apart from each other. In FIG. 5, seven teeth are shown, but a greater or lesser number of teeth may be provided in other embodiments.

Referring again to FIG. 2, the ring gear 72 may be fixedly disposed relative to the housing 40. The ring gear 72 may include a plurality of teeth that may be disposed around an inside diameter and may face toward the sun gear 70.

The planet gears 74 be spaced apart from each other and may be disposed between the sun gear 70 and the ring gear 72. In the embodiment shown, three planet gears 74 are provided (with one planet gear 74 being concealed behind other components of the planetary gear set 46 from the perspective shown in FIG. 2), but a different number may be employed in other embodiments.

Figure 6:
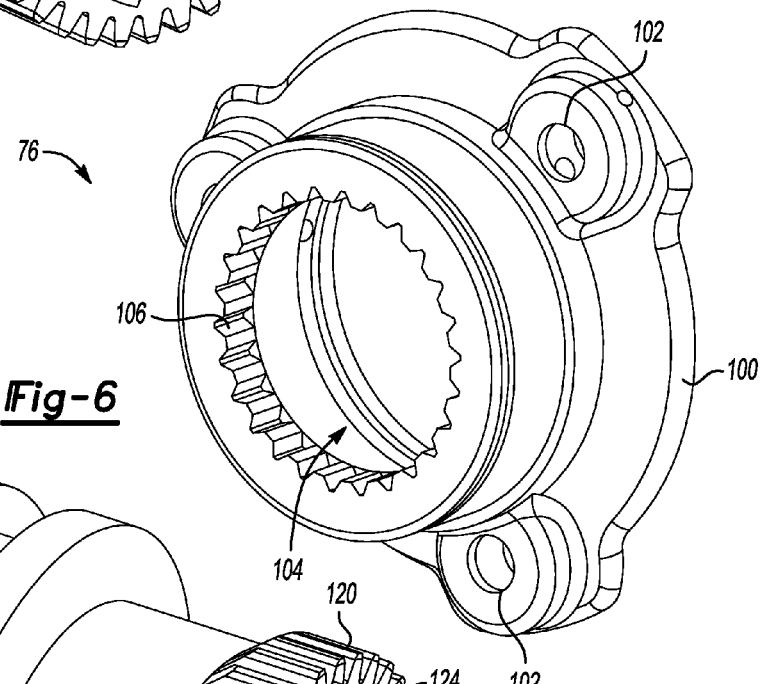
FIG. 6 is a perspective view of an exemplary planet gear carrier.

Referring to FIG. 6, an exemplary planet gear carrier 76 is shown. The planet gear carrier 76 may be configured to support and position the planet gears 74. The planet gear carrier 76 may include a flange 100 having a plurality of openings 102 that may be substantially equidistantly spaced apart from each other. Each opening 102 may receive a fastener, such as a pin, for coupling the planet gears 74 to the planet gear carrier 76. The planet gear carrier 76 may also include a hole 104 that includes a spline 106 that may be provided on an inside diameter or surface that defines at least a portion of the hole 104. The spline 106 may selectively engage a corresponding spline on the clutch collar 48 as will be described in more detail below.

Figure 7:
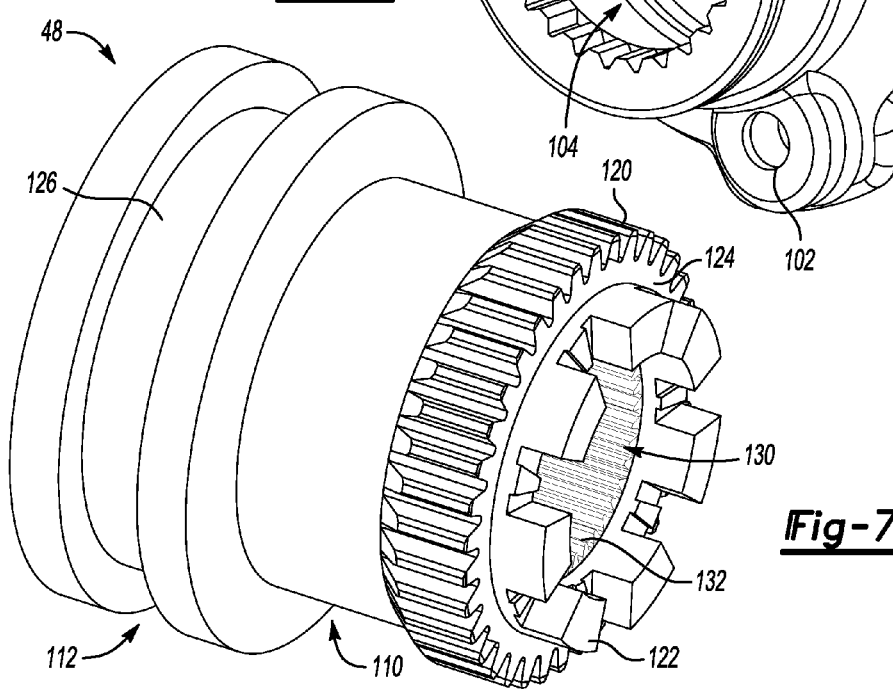
FIG. 7 is a perspective view of an exemplary clutch collar.

Referring to FIG. 7, an exemplary clutch collar 48 is shown. The clutch collar 48 may include a hub portion 110 and a collar portion 112 that may be integrally formed with and may extend from an end of the hub portion 110. The hub portion 110 may have a generally cylindrical configuration and may include a spline 120 and a face gear 122.

The spline 120 may be provided on at least a portion of an exterior surface of the hub portion 110. The teeth of the spline 120 may extend substantially parallel to the axis of rotation 60 and may be configured to selectively engage and mate with the teeth of the spline 106 on the planet gear carrier 76.

The face gear 122 may be provided on or extend from an end surface 124 of the clutch collar 48 that faces toward the sun gear 70. The end surface 124 may extend substantially perpendicular to the axis of rotation 60 in one or more embodiments. The face gear 122 may include a set of teeth that may be arranged around the axis of rotation 60. In at least one embodiment, the teeth may be disposed at a common radial distance from the axis of rotation 60 and substantially equidistantly spaced apart from each other. In FIG. 7, seven teeth are shown, but a greater or lesser number of teeth may be provided in other embodiments. The teeth of the face gear 122 may be configured to engage and mesh with the teeth of the face gear or second gear portion 86 of the sun gear 70.

The collar portion 112 may be disposed opposite the end surface 124 and may generally have a larger diameter than the hub portion 110. The collar portion 112 may include an annular groove 126 that extends around the collar portion 112. The annular groove 126 may receive a shift fork as will be described in more detail below.

The hub portion 110 and collar portion 112 may cooperate to define a through hole 130 that extends through the clutch collar 48. The through hole 130 may extend along and be substantially centered about the axis of rotation 60. A spline 132 may be provided on an interior surface that defines at least a portion of the through hole 130. The teeth of the spline 132 may extend substantially parallel to the axis of rotation 60 and may be configured to selectively engage and mate with the teeth of the spline 64 on the input shaft 44.

Figure 3:
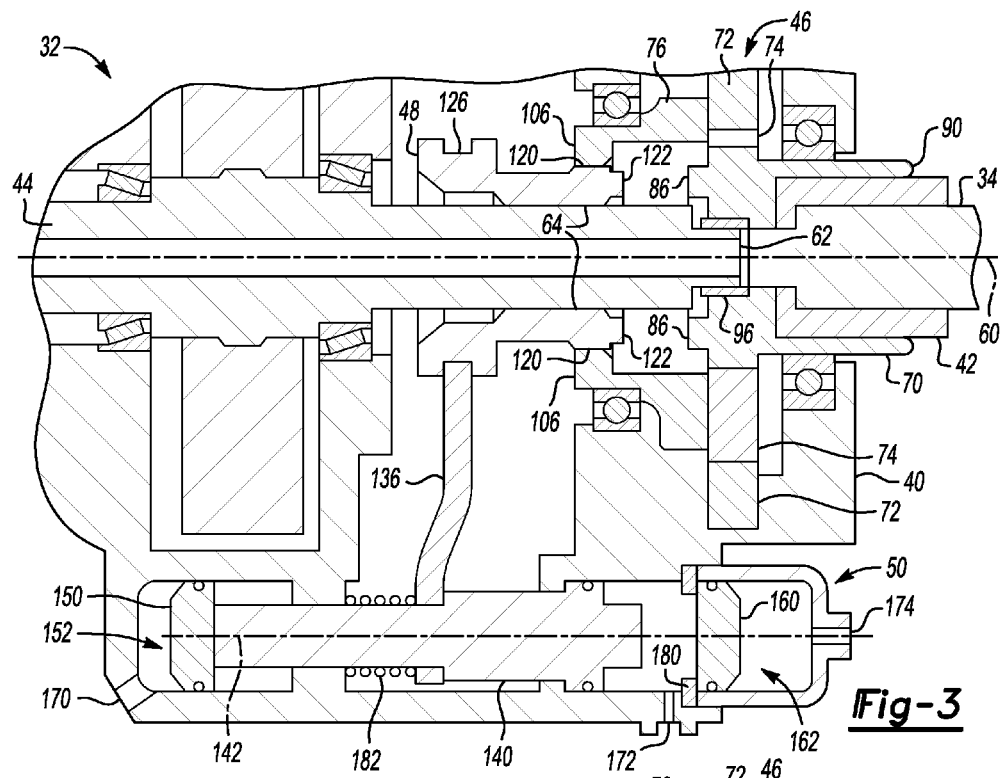
FIG. 3 is a fragmentary section view of a portion of the transfer case illustrating a low speed range position.
Figure 4:
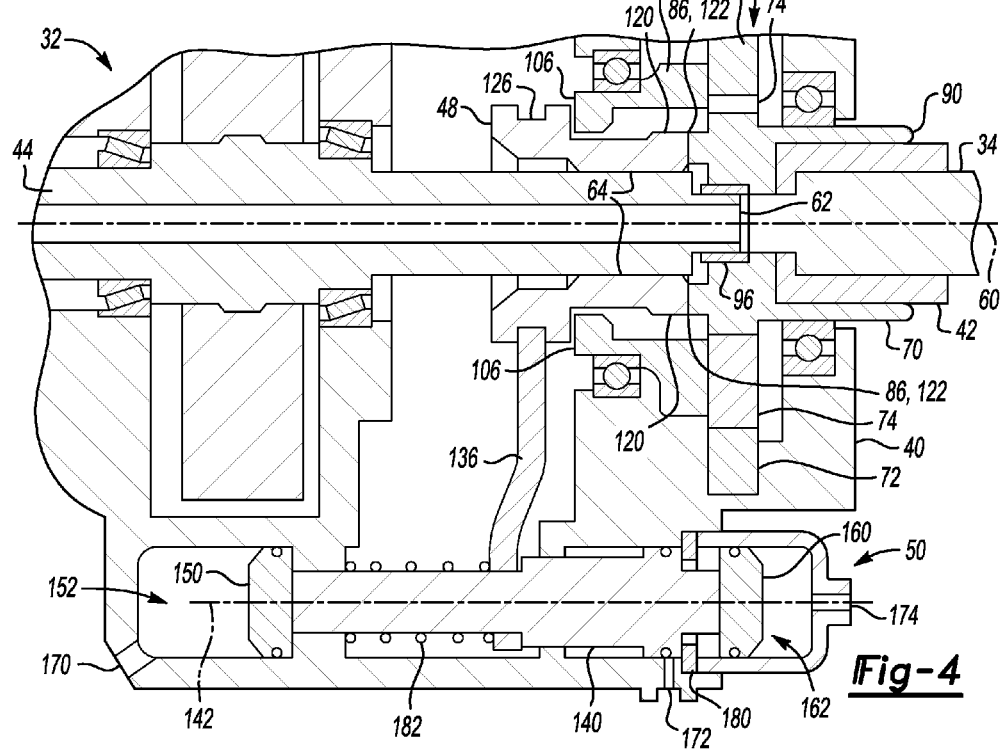
FIG. 4 is a fragmentary section view of a portion of the transfer case illustrating a high speed range position.

Referring to FIGS. 2-4, the actuator 50 may be provided for actuating the clutch collar 48 between a plurality of discrete operation positions. The actuator 50 may be of any suitable type, such as a pneumatic, hydraulic, mechanical, electrical, or electromechanical actuator. In FIGS. 2-4, a pneumatic actuator is shown. The actuator 50 may be coupled to the clutch collar 48 via a shift fork 136 that has a first end that may be configured to be received in the annular groove 126 of the clutch collar 48 and a second end that may engage the actuator 50.

In the embodiment shown, the actuator 50 includes an actuator shaft 140 that may be configured move along an axis 142. A first piston 150 may be fixedly disposed on a first end of the actuator shaft 140 and disposed in a first chamber 152. A second piston 160 may be disposed in a second chamber 162 that may be spaced apart from the first chamber 152. The second piston 160 may be actuated by but not fixedly disposed on a second end of the actuator shaft 140 that may be disposed opposite the first end.

The first chamber 152 may have a first port 170. The second chamber 162 may have a second port 172 and a third port 174. The first, second, and third ports 170, 172, 174 may be configured to provide or vent a pressurized fluid, such as air, that may be provided by a pressurized fluid source (not shown). The flow and venting of the pressurized fluid may be controlled with valves, such as electrically controlled solenoid valves, in a manner known to those skilled in the art. Control may be facilitated by a controller or control module that may be microprocessor-based.

A stop 180 may be disposed in the second chamber 162 between the second and third ports 172, 174 for limiting movement of the second piston 160 toward the first chamber 152 (i.e., to the right from the perspective shown in FIGS. 2-4).

A spring 182 may also be provided to facilitate positioning the actuator shaft 140 and shift fork 136. In at least one embodiment, the spring 182 may be disposed around the actuator shaft 140 and may be located between the first and second cavities 152, 162. The spring 182 may have a first end that engages the housing 40 and a second end that may be configured to engage the shift fork 136.

Operation of the actuator 50 and the selection of transfer case gear ratios will now be discussed in more detail.

Referring to FIG. 2, the transfer case 32 is shown in a neutral position. In the neutral position, pressurized fluid may be provided to the first and third ports 170, 174 and vented from the second port 172. As such, the actuator shaft 140 moves to a middle position in which the force exerted by the first piston 150 (in response to pressurized fluid provided via the first port 170) and spring 182 moves the actuator shaft 140 into engagement with the second piston 160 (i.e., to the right from the perspective shown). The second piston 160 may be biased against the stop 180 due to force exerted by the pressurized fluid provided via the third port 174 (i.e., to the left from the perspective shown) to limit movement of the actuator shaft 140. In the neutral position, the clutch collar 48 is disengaged from the sun gear 70 and the planet gear carrier 76. More specifically, the actuator 50 may position the shift fork 136 and the clutch collar 48 along the input shaft 44 such that the face gear 122 on the clutch collar 48 is spaced apart from the face gear or second gear portion 86 on the sun gear 70 and the spline 120 on the clutch collar 48 does not engage the spline 106 on the planet gear carrier 76.

In FIG. 3, the transfer case 32 is shown in the low speed range position. In the low speed range position, pressurized fluid may be provided to the second and third ports 172, 174 and vented from the first port 170. As such, pressurized fluid provided via the third port 174 holds the second piston 160 against the stop 180 and pressurized fluid provided via the second port 172 biases the actuator shaft 140 toward the first chamber 152 or to the left from the perspective shown. In the low speed range position the clutch collar 48 is disengaged from the sun gear 70 and engages the planet gear carrier 76. More specifically, the actuator 50 may position or move the shift fork 136 and the clutch collar 48 along the input shaft 44 such that the face gear 122 on the clutch collar 48 is spaced apart from the face gear or second gear portion 86 on the sun gear 70 and the spline 120 on the clutch collar 48 engages and mates with the spline 106 on the planet gear carrier 76. As such, torque from the output shaft 34 of the transmission 30 passes through the planet gears 74 (i.e., from the sun gear 70 to the planet gears 74 to the planet gear carrier 76 to the clutch collar 48) to rotate the input shaft 44.

In FIG. 4, the transfer case 32 is shown in the high speed range position. The high speed range position may employ a gear ratio that facilitates greater road speed and vehicle fuel economy as compared to the low speed range gear ratio. In the high speed range position, pressurized fluid may be provided to the first port 170 and vented from the second and third ports 172, 174. As such, pressurized fluid provided via the first port 170 biases the actuator shaft 140 toward the second chamber 162 or to the right from the perspective shown. In the high speed range position the clutch collar 48 engages the sun gear 70 and is disengaged from the planet gear carrier 76. More specifically, the actuator 50 may position or move the shift fork 136 and the clutch collar 48 along the input shaft 44 such that the face gear 122 on the clutch collar 48 engages and mates with the face gear or second gear portion 86 on the sun gear 70 and the spline 120 on the clutch collar 48 disengages the spline 106 on the planet gear carrier 76. As such, torque from the output shaft 34 of the transmission 30 passes through the sun gear 70 directly to the clutch collar 48 to rotate the input shaft 44.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A transfer case comprising:
   a planetary gear set configured to be rotated by a shaft that is driven by a power source, the planetary gear set having a sun gear, a plurality of planet gears, a ring gear, and a planet gear carrier;
   a clutch collar moveably disposed on an input shaft for selectively coupling the planetary gear set to the input shaft; and
   an actuator configured to actuate the clutch collar between a low speed range position in which the clutch collar engages the planet gear carrier and is disengaged from the sun gear and a high speed range position in which the clutch collar engages a face gear on the sun gear and is disengaged from the planet gear carrier, wherein the actuator has an actuator shaft that is operatively coupled to the clutch collar and first and second pistons that are moveably disposed in first and second cavities that are located proximate opposite ends of the actuator shaft, respectively, such that the first piston is disposed proximate a first end of the actuator shaft and the second piston is not fixedly disposed on the actuator shaft.

2. The transfer case of claim 1 wherein the actuator is configured to actuate the clutch collar to a neutral position in which the clutch collar is disengaged from the planet gear carrier and the sun gear.

3. The transfer case of claim 1 wherein the input shaft, sun gear, and clutch collar are configured to rotate about an axis of rotation, wherein the clutch collar moves along the axis of rotation toward the sun gear to engage the sun gear and disengage the planet gear carrier.

4. The transfer case of claim 1 wherein the input shaft, sun gear, and clutch collar are configured to rotate about an axis of rotation, wherein the clutch collar moves along the axis of rotation away from the sun gear to disengage the sun gear and engage the planet gear carrier.

5. The transfer case of claim 1 wherein the actuator is a pneumatic actuator and a shift fork couples the actuator to the clutch collar.

6. The transfer case of claim 1 wherein a bearing permits the input shaft to rotate at a different speed than the sun gear.

7. The transfer case of claim 1 wherein the input shaft and clutch collar include mating splines having teeth that extend parallel to an axis of rotation.

8. A transfer case, comprising:
   an input shaft;
   a clutch collar moveably disposed on the input shaft, the clutch collar having a face gear provided on an end surface and a spline provided along a circumference of the clutch collar;

a planetary gear set having a sun gear operatively coupled to a planet gear carrier via a plurality of planet gears, the sun gear having a face gear and the planet gear carrier having a spline; and an actuator that includes an actuator shaft that is operatively coupled to the clutch collar and that has first and second pistons that are disposed in first and second cavities that are disposed proximate opposite ends of the actuator shaft, respectively, wherein the first cavity has a first port, the second cavity has second and third ports, and wherein pressurized fluid is provided to the first cavity via the first port to actuate the clutch collar to a high range speed position and pressurized fluid is provided to the second cavity via the third port to actuate the clutch collar to a low range speed position, wherein a stop is disposed between the second piston and the second port that limits movement of the second piston toward the first piston;

wherein the face gear on the clutch collar engages the face gear on the sun gear when the clutch collar is in the high speed range position; and wherein the spline on the clutch collar engages the spline on the planet gear carrier when the clutch collar is in the low speed range position.

9. The transfer case of claim 8 wherein the spline on the clutch collar is spaced apart from the spline on the planet gear carrier when the clutch collar is in the high speed range position.

10. The transfer case of claim 8 wherein the face gear on the clutch collar is spaced apart from the face gear on the sun gear when the clutch collar is in the low speed range position.

11. The transfer case of claim 8 wherein the face gear on the clutch collar is spaced apart from the face gear on the sun gear when the clutch collar and the spline on the clutch collar is spaced apart from the spline on the planet gear carrier when the clutch collar is in a neutral position.

12. The transfer case of claim 8 further comprising a shift fork that couples the actuator shaft to the clutch collar.

13. The transfer case of claim 8 wherein the end surface of the clutch collar extends substantially perpendicular to an axis of rotation about which the clutch collar is configured to rotate.

14. The transfer case of claim 8 wherein the clutch collar includes a through hole that includes a second spline that mates with a spline on the input shaft to permit the clutch collar to slide toward and away from the sun gear.

15. The transfer case of claim 14 wherein the spline on the clutch collar is provided on an outer surface disposed opposite the second spline.

16. A transfer case for a vehicle, comprising:
an input shaft;
a clutch collar disposed on the input shaft, the clutch collar being configured to move between a first position in which a first gear ratio is engaged and a second position in which a second gear ratio is engaged;
an actuator that includes:
a first piston disposed in a first cavity having a first port;
a second piston disposed in a second cavity having second and third ports; and
an actuator shaft configured to engage the first and second pistons; and
a shift fork that couples the actuator shaft and the clutch collar;
wherein pressurized fluid is provided to the first cavity via the first port to actuate the clutch collar to the first position and pressurized fluid is provided to the second cavity via the second and third ports to actuate the clutch collar to the second position.

17. The transfer case of claim 16 wherein the first piston is fixedly disposed on the actuator shaft and the second piston is not fixedly disposed on the actuator shaft.

18. The transfer case of claim 16 wherein a stop is disposed in the second cavity, wherein pressurized fluid provided via the third port actuates the second piston against the stop.

19. The transfer case of claim 18 wherein the second piston is disposed between the stop and the third port and the stop is disposed between the second piston and the second port.

20. The transfer case of claim 18 wherein pressurized fluid is provided to the first cavity via the first port and the second cavity via the third port but not the second port to move the clutch collar to a neutral position in which no gear ratio is engaged.

* * * * *